Figure 1:
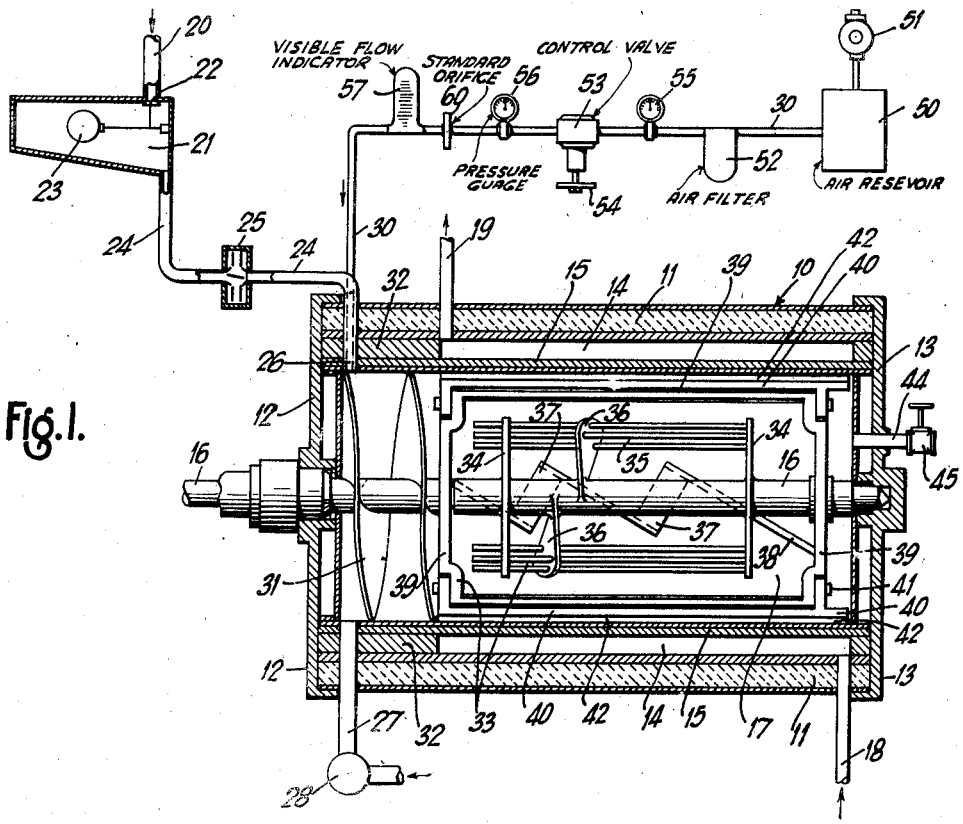

Oct. 4, 1938.  E. THOMPSON  2,132,364

PROCESS AND APPARATUS FOR CONGEALING LIQUIDS

Filed Nov. 14, 1935

INVENTOR
EMERY THOMPSON
BY
Austin & Din
ATTORNEYS

Patented Oct. 4, 1938

2,132,364

UNITED STATES PATENT OFFICE 2,132,364

PROCESS AND APPARATUS FOR CONGEALING LIQUIDS

Emery Thompson, Larchmont, N. Y., assignor to Emery Thompson Machine & Supply Company, Bronx, N. Y., a corporation of New York Application November 14, 1935, Serial No. 49,649

21 Claims. (Cl. 62—114)

This invention relates to improvements in apparatus suitable for congealing or freezing ice cream or converting other liquids to solids, and more particularly relates to the provision of superior apparatus for continuously freezing ice cream or the like while incorporating into the frozen mixture a desired uniform amount of air or similar gas.

In order to produce an ice cream or the like which is smooth and palatable, not too cold to the taste, and of uniform quality, one problem of paramount importance is the introduction into the mixture of air, carbon dioxide or other like gas, in such fashion that the product will contain precisely the proper amount of the air or gas evenly distributed through the mass. If excessive air is introduced the ice cream will be too light or frothy, and if not enough air is incorporated the product will be too heavy and too cold for comfort while eating. The blending of air with the mix is generally called "over-run", and may be defined as the ratio of the increase in volume of the final product to the original volume of mix, this ratio of increase in volume being expressed as a percentage of the original volume of mix. When, for example, equal volumes of mix and air are blended in a product, there is said to be a 100% "over-run". As another example, when the increase in volume amounts to one and one-quarter times the original volume of mix, there is said to be 125% "over-run".

Now, while the "over-run" may vary over wide ranges, depending upon the type of mix employed as well as upon quality of the product wanted, it is highly important to provide for accurately controlling the "over-run" for given conditions within narrow limits, so that an ice cream manufacturer or other person using the apparatus may depend upon producing a standard grade of ice cream or the like. In continuous-type apparatus it is especially difficult to produce a highly uniform product, e. g., one in which the air or other gas is fully and evenly distributed throughout all portions of the congealed mass. When a dasher is used the difficulties in the way of introducing a steady stream of air appear to be aggravated.

A feature of the present invention accordingly resides in the provision of an improved process and apparatus for the purposes mentioned, which accomplish these objects in a simple and highly effective manner.

A more specific feature lies in providing an ice cream freezer which feeds mix continuously at a constant rate and which simultaneously feeds air into the mix at a controlled and steady rate, so that the air is uniformly distributed in the mixture, irrespective of changes of pressure or pulsations in the chamber in which the mass is congealed.

Still another feature of the invention resides in the provision of an air feeding device adapted for apparatus of this character, which device is at once simple and inexpensive to manufacture and automatic in operation, supplying air or other gas at a uniform rate of flow with a minimum of supervision.

Another feature resides in the provision of apparatus for feeding air or other gas at a constant rate of flow and for enabling this rate of flow to be varied for different operating conditions by changing the pressure of the air supply. In other words, it is a feature of the preferred construction that the mass of air delivered per unit of time may be varied over a substantial range by simply changing the pressure of the air supply at a convenient point, while at the same time, for any given setting of the supply pressure, the rate of flow of gas delivered is constant during continuous operations.

A further feature of the present invention lies in providing gas feeding apparatus of the character indicated which may be employed wherever it is desired to feed gas at constant rates of flow against varying pressures at the point of delivery of the gas.

More specifically, a feature of the invention lies in the construction of apparatus in which air or other gas under relatively high pressure is fed through a valve or the like which reduces the pressure to a predetermined lower pressure, which is thus maintained constant, whereafter the gas under reduced pressure is fed through a constriction, such as an orifice, which is constructed to control the flow of the gas therethrough at a constant rate (constant mass per unit of time) depending upon said reduced pressure in back of the orifice.

Still another specific feature of the present invention resides in the provision of gas feeding apparatus of the character mentioned in combination with a chamber into which liquid mix is also fed at a substantially constant rate and is congealed and continuously discharged at a definite temperature controlled by the rate of refrigeration.

More detailed features lie in such a device which is capable of being readily adjusted for supplying air at any usual or desired rate of "over-run"; and in such a device including means for enabling the attendant or operator to observe the flow of air.

A further feature of the invention lies in the provision of apparatus of the aforementioned character including a device for feeding the mix and also for assisting in preventing pulsations (due to stirring the mix or other causes) from being refluxed so as to adversely affect the uniformity of the air supply.

The specific example herein described as embodying the invention is directed to the apparatus and method of efficiently producing ice cream continuously, or substantially continuously, as desired. It will be understood, however, that this apparatus may advantageously be used in the hydrogenation of oils, the manufacture of cold cream, aerated honey, or the processing of any fluid with a gas.

One of the features of the invention is the provision of an improved means for more efficiently controlling the flow of air or gas to the liquid or fluid into which the air or gas is introduced.

Figure 2:
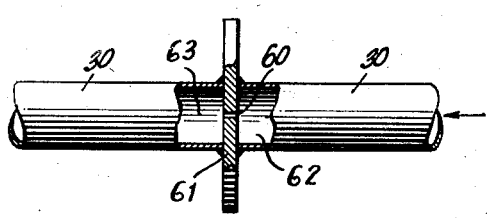

Other features, objects and advantages of the present invention will in part be pointed out and in part become apparent in connection with the following description of certain detailed forms of apparatus illustrating the invention, reference being had to the accompanying drawing wherein:

Fig. 1 is a side elevation of apparatus in accordance with the present invention, shown partially in section; and Fig. 2 is an elevation, partly in section, illustrating a detail of one form of air feeding device, also in accordance with the invention.

Referring now to the drawing, there is shown at 10 a container of any suitable construction which may be generally cylindrical, lined with insulating material 11, and provided with end plates 12 and 13. An inner wall 15 may serve to form an annular compartment 14, through which a refrigerant may circulate, and may also serve as the outer wall of a chamber 17 through which the material to be refrigerated passes. The parts of the construction thus far described may be composed of any materials which are satisfactory for the purposes indicated.

Extending through the chamber 17, preferably horizontally, is a shaft 16 which may be supported in any suitable bearings carried by the end walls 12 and 13. This shaft may be driven from a source of power such as an electric motor (not shown) and carries, as will hereafter be described, the various devices for feeding and mixing or stirring the materials to be congealed or frozen. When a liquid refrigerant is employed, it may be fed into the annular chamber 14 through an inlet pipe 18 and after circulating about may discharge through outlet pipe 19. Ordinarily, the rate of refrigeration may be controlled by adjusting the flow of refrigerant, for instance, by suitable valves (not shown), so that the product will be discharged at uniform temperature. However, other types of refrigerant may be employed, or other arrangements made for effecting this purpose.

The liquid mix to be fed to the refrigerating chamber 17 may be supplied through a pipe 20 to a suitable reservoir 21, under control of a valve 22 actuated by float 23, for affording a constant head of liquid. A suitable liquid pump 25 is preferably used to force the mix into chamber 17 through a pipe 24, the end 26 of which is preferably located adjacent the inlet end 12 of the chamber 17. When it is desired to feed the mass, consisting principally of milk, in the case of ice cream, and the fruit, nuts or other flavoring through a separate tube, the latter may be introduced by means of a pump 28 through a pipe 27, the outlet end of which may also be located near the same end of the refrigerating chamber. It will be appreciated, however, that when desired, the mix and flavoring may both be fed in at one point, and that while advantages are secured by introducing the liquid close to one end of the chamber, it may be introduced at other points.

The air for the desired over-run may be fed in through a pipe 30, by a device hereafter described, also near the end of the chamber where the liquid mass is introduced. In the form shown in Fig. 1, the air line 30 separately enters the chamber 17, but if desired, the air may be mixed with the liquid prior to the time this liquid enters the refrigerating chamber. On the other hand, at least in the broader aspects of the invention, the air may be introduced into the liquid at a point farther along the chamber 17 toward the outlet end, although it is advisable to introduce the air before the mass becomes too solid.

Adjacent the inlet end of the chamber 17, there is preferably mounted upon the shaft 16 a suitable spiral screw 31, adapted to feed the material forward. In the form illustrated, this screw is solid and has a diameter substantially the same as the diameter of the chamber 17 so that it will efficiently feed the material forward, and also assist somewhat in preventing pressure changes in the other end of the chamber 17 from being refluxed so as to affect the air fed through pipe 30. This screw may have any suitable number of convolutions, but advantageously occupies only a relatively small portion of the length of the chamber 17. Where such a screw is employed, it may be desirable to block out certain portions of the chamber 14 through which the cooling medium circulates so that the refrigeration will not result in interfering with the operation of the screw. With this purpose in view, any suitable filling material may be inserted as at 32, or the construction may be otherwise modified so that the refrigerant does not circulate around the portion of the chamber in which the screw is located. Between the screw 31 and the outlet end 13 of the chamber, there may be provided, for stirring or beating the mix and air, a dasher indicated generally at 33.

This dasher may comprise a pair of radial members 34 carrying a series of longitudinal whipper rods 35. Propeller blades 36 may also be secured to or formed on the shaft 16, while other blades 37 may extend at angles as shown, being mounted upon suitable rods 38. A rectangular frame 39 may be mounted on the shaft and have secured thereto scraper blades 40 which may be secured through bolts 41. If desired, the outer portions 42 of the scraper blades may be made of somewhat flexible material. While the form of dasher described is particularly advantageous for many purposes, and while claim may be made to it elsewhere, it will be understood that the present invention in its broader aspects is not limited to any particular type of dasher, or, indeed, even to the use of a dasher. The outlet end of the apparatus may be provided with a pipe 44 suitable for withdrawing ice cream or other congealed material under control of a valve 45, or other suitable similar device.

In order to provide for a uniform feed of air there is preferably provided means for maintaining a supply of air under substantially constant pressure and a device in the air line which serves to prevent pressure changes or pulsations in the freezing chamber from backing up or otherwise affecting the desired constant flow of air into this chamber. In accordance with one preferred form of the invention, this device comprises a constriction in the air line, such as a standard orifice or short tube, which once calibrated for given conditions, requires no further adjustments and is automatic in operation. Preferably, the apparatus also includes a valve of suitable construction for admitting air or other gas from a high pressure reservoir, to a chamber on the upstream side of the orifice or the like, and for maintaining any one of a number of different predetermined constant pressures in said upstream chamber, whereby various desired constant rates of feed of air may be secured.

With reference to the form of device illustrated, there may be employed an air supply tank or high pressure reservoir 50 connected to the air line 30. For instance, tanks of compressed air, carbon dioxide or other suitable gas may be connected to the line in multiple, if desired, and be valved in or out as required, or a suitable air compressor 51 may be employed for maintaining a uniform pressure in the tank 50, any convenient known equipment being used to start the compressor when the pressure in tank 50 falls below a pre-set minimum and to stop it when a pre-set maximum is reached. If desired, the air from tank 50 may be washed and/or filtered through any satisfactory type of known device 52 for this purpose.

The air is then passed through the manually operated pressure regulating valve 53, by which the air pressure in the upstream chamber referred to may be set to the desired pressure for a given over-run. This regulating valve is preferably of such design that it can take the high pressure air from the air source 50 and reduce it to any desired lower pressure by a setting of the manual control and maintain it at such desired pressure, regardless of variations in reservoir pressure, so long as this latter pressure remains higher than the pressure for which the valve has been set. Such valves are in themselves known. Pressure gauges 55 and 56 may be attached to the line 30 on either side of the valve 53, so that the operator can readily note the existing pressures and make any necessary adjustments. Gauge 56 indicates the pressure in the upstream chamber.

In accordance with the preferred form of the present invention, there is provided an orifice or the like and a source of constant pressure so combined that there is a constant flow of air through the orifice or similar constriction regardless of changes of pressure or backward pulsations on the downstream side of the orifice. In order to obtain this result to best advantage, it is preferred to construct the orifice, having regard to the desired rates of flow (the mass of air to be delivered per unit of time), so that the absolute pressure on the downstream side of the orifice is less than about .53 times the absolute pressure on the upstream side, which results in a substantially constant velocity and constant flow through the orifice. That is to say, the pressure on the upstream side should be maintained, for a given orifice, so that it is more than about double the pressure on the downstream side, for when the pressure on the downstream side becomes greater than the critical value of .53 times the pressure on the upstream side, the flow tends to vary from the desired constant rate. However, it will be appreciated that in some circumstances, where maximum accuracy is not required, the practice of the invention, at least in its broader aspects, is not confined to the critical value stated. Moreover, the constant factor varies for different gases, but can be determined for any particular gas.

While I do not wish to be limited to the following analysis, it appears that by providing an orifice or the like which is large enough to permit the desired mass of air per unit of time to flow through it, and which at the same time is small enough, as compared to the upstream chamber, to prevent pressure changes or pulsations on the outlet or downstream side of the orifice from substantially affecting the steady flow of air through the orifice at high velocity or the pressure on the upstream side, and by maintaining a relatively high pressure on the upstream side, the high velocity of the air passing through the orifice will maintain or work to produce a constant flow of air through the orifice, so that the mass of air which is supplied to the downstream side, and thus the mass of air which is delivered per unit of time, is a constant, irrespective of any ordinary changes of pressure or pulsations below the orifice, so long as the required absolute pressure differential on opposite sides of the orifice is maintained.

The orifice 60 may be regarded as a metering orifice, and so long as gas is supplied at constant pressure on the up-stream side of the metering orifice and is maintained at more than about twice the pressure of gas on the down-stream of the orifice, the flow of gas and the mass thereof through the metering orifice will be constant in spite of any back pressures on the down-stream side of the orifice due to pulsations or fluctuations. Usually such fluctuations or pulsations in pressure on the down-stream side of the orifice are caused by the action in the freezer, be that action due to the operation of the dasher or the improper operation of the outlet valve. This metering orifice prevents the pulsations or fluctuations from reaching the pressure-reducing valve 53, and thereby prevents any adverse effect in delivering a constant mass of gas for use in the freezing of the ice cream. That is to say, none of the pulsations or fluctuations which normally develop in the freezing of the ice cream, are permitted to affect in any manner the proper supply of air. The orifice prevents pulsations from reaching the pressure reducing valve 53 to affect its function of delivering a constant pressure of gas at the upstream side of the orifice.

An example of a ratio which has been found to be satisfactory is where there is a 30 lb. per sq. inch pressure on the up-stream side of the metering orifice 60, and a pressure on the down-stream side of the orifice varying between 2 and 4 lbs. per sq. in., giving a momentary pressure of 3 lbs. per sq. in. If the 3 lbs. per sq. in. is divided by 30 lbs. per sq. in., it will be noted that the ratio is .1, and is therefore less than the .53 figure noted above.

Another example is where the supply of air or gas on the up-stream side of the metering orifice is 20 lbs. per sq. in., and the average pressure on down-stream is found to be 3 lbs. per sq. in., then the ratio is 3 divided by 20 equaling .15. If, in this last example the average pressure on the down-stream side changes to 4 lbs. per sq. in.

then the ratio is .2, which is still less than the .53 figure.

It will be noted that for a given sized orifice, air or gas will flow through it at an increasing velocity as the pressure on the upstream side is increased until a critical velocity is reached. The velocity of the air through the orifice will never be greater than this critical velocity, regardless of the increase in pressure above the critical pressure on the up-stream side. When the pressure of the air on the up-stream side is increased above the critical pressure the mass of air flowing through the orifice increases though it continues to flow at the critical velocity.

The air control for this type of machine is intended to control the mass of air supplied to the freezer rather than the pressure at which it is supplied. The mass of the mix supplied to the freezer is controlled by common methods. For the purpose of controlling the percentage of overrun it is necessary to control accurately the mass of air supplied to the freezer.

When the ratio of pressures below and above the orifice 60 is maintained at or less than the critical value of .53, the mass of air flowing through the control is in direct proportion of the pressure above the orifice, and changes in pressure on the down-stream side of the orifice will not affect the flow of air unless said pressure will change the ratio to more than .53. This feature is of advantage in simplifying the manufacture, calibration and operation of the machine.

Of course, if the valve 45 in the outlet pipe 44 were closed the pressure in the freezer would soon build up until the back pressure below or on the down-stream side of the orifice would become greater than .53 times the pressure above the orifice, but in normal operation the valve 45 is open so that the frozen material may flow out of the machine. Under these conditions the total back pressure will not build up and only momentary fluctuations in pressure or pulsations have to be provided for so as not to reduce the mass of air inflow to the down-stream side of the orifice.

It will be understood that usually the valve 45 is open to allow continuous outflow of the ice cream, but intermittent operation of this valve 45 is possible so long as it does not remain closed for too long a period or for such a length of time that the pressures in the freezer and supply line will build up to a point above the critical ratio figure of .53.

If for any reason, the mass of air supplied changes and there is no change in the mass of mix supplied then the percentage of overrun will change, thereby changing the quality and uniformity of the ice cream. The present machine is designed to eliminate possibilities of changing the air supply except by deliberate manual adjustment.

When the machine herein disclosed is set in operation, only the failure of air supply or manual adjustment can change the percentage of overrun and therefore change the quality and uniformity of the ice cream produced.

It will therefore be seen that the back pressures cannot affect the mass of air supplied, and therefore the quality and uniformity of the ice cream will be maintained. By reason of the use herein of the metering orifice 60 under the conditions designed for it the quality of the ice cream produced is always maintained and uniformity is accurately controlled.

Moreover, by providing for the maintenance of a constant pressure above the orifice at any one of various different values, and by providing a restricted opening of the character described, through which the air flows from a relatively high pressure to a relatively low pressure, the flow of air through the constricted opening may thus be maintained at any one of a number of different constant rates substantially irrespective of the pressure on the downstream side so long as this pressure does not fluctuate too greatly above the critical value mentioned.

Thus, there is provided a construction which is particularly effective for feeding air or gas at the constant rate especially desired in the case of congealed liquids which should contain a uniform over-run of air or other gas. Moreover, the construction is especially simple to manufacture and easy to operate, since once the operator has set the control valve for a predetermined upstream pressure, the feed of air will be continuous and constant without any further supervision, as long as the upstream pressure is maintained, as it can be through any convenient device.

As shown diagrammatically in Fig. 2, the constriction in line 30 may comprise a member such as a plate 61 carrying a standard orifice 60 or short tube preferably constructed so that the pressure in downstream chamber 63 is less than about .53 times the pressure in the upstream chamber 62 (for air). Under normal operating conditions the upstream pressure will be sufficiently high to maintain this pressure ratio. The diameters of the chambers should be large with respect to the diameter of the orifice, usually at least 5 to 1. The orifice may be of any common type such as "sharp edge", "rounded edge", "thick plate", or "short tube", or may be of a somewhat modified form. While an orifice is generally preferred, a properly proportioned throat, such as a Venturi throat may likewise serve present purposes, though not as accurate. Where the term "orifice-type" is used herein it intends any suitable orifice or equivalent construction.

The constriction in the pipe 30 may be located at any convenient point therein, but is preferably not immediately adjacent the end of the pipe where the air enters the refrigerating compartment, so that there is a substantial volume of air between the orifice and the point where the air enters the mix. However, in the broader aspects of the device, the particular location of the constriction is not of the essence.

In order to enable the operator to note the flow of air, and thus make doubly sure of desired conditions, a visible flow meter 57 may be attached to line 30 at any convenient point, advantageously between orifice 60 and the chamber 17, so that the air flow may be observed. To one familiar with the operation of a particular machine, this device alone may furnish an approximate, if not exact, indication of the air flow, and it may even be possible, when such a meter is used, to dispense with one or more of the other gauges.

While the description has been largely confined to the introduction of air into mix during the manufacture of ice cream, it will be appreciated that the present apparatus is also useful in connection with introducing other compressible gases into various non-compressible liquids which are congealed into solids owing to a temperature change, especially wherever there is change in volume during the operations, and wherever an intimate and uniform mixing is desired. For such other operations it may be desirable to construct the orifice or the like so that the pipe section in which it lies is readily removable, and this and other details of the arrangement of the orifice may take any convenient form.

The air or gas flow system may be employed for other purposes if desired, whether the air is to flow to materials which are later to be congealed, or to flow into a mixture of liquids and gases, or even into gases alone where constant flow is an object.

This apparatus provides for the addition of a desired amount of volume of air to the total volume of the final product. Also the apparatus may be employed for other purposes than making ice cream and with or without refrigeration, or with only a small amount of refrigeration. In the event the apparatus is employed where it is desirable at times to employ heat instead of chilling, it will be found that it is readily adapted for such purposes. Some of the examples of such other uses constitute the preparation of lard, cold cream, cotton-seed oil, honey with air distributed therein and the like, or any other material that needs air or gas distributed therethrough. This improved apparatus also may be readily employed in the hydrogenation of various products.

It will be noted from the description herein that a definite size area of orifice will permit, under a definite pressure, a flow of a certain amount of cubic inches of air or gas per minute. Changing the pressure with the same area of orifice will give a different cubic inch flow of air per minute, or changing the area of the orifice will give another change in volumetric flow of air or gas. In addition, the use of another gas with even the same area of orifice, will result in a change in the cubic inch flow of gas. It will thus be noted that, once the desired orifice is employed and the proper adjustment made, the percentage of over-run will be maintained within limits that allow the production of ice cream that is very acceptable to the market.

It will further be noted that the air or gas is fed continuously and at a substantially constant volumetric rate. The feeding of the air or gas to the freezer is, therefore, not intermittent. As indicated in the detailed description above, there is provided an improved apparatus in which the liquid and gas are continuously admitted in substantially constant stream or streams to the chamber in which the mixing, or mixing and freezing take place. It will, therefore, be seen that the improved apparatus herein, in producing ice cream, may be said to congeal a liquid or a liquid mix while incorporating thereinto air or a gas. The apparatus also controls the volume of air or gas per unit of time thereby providing the desired amount of air volume to the total volume of the final product. The percentage of this added air volume to the volume of the final product is known as the "over-run".

The present invention thus provides a construction which is reasonably simple and inexpensive to manufacture and which enables air to be fed into a chamber in which it is mixed with a liquid and congealed. The air is fed at a uniform rate without the need for any moving parts in the air feeding device. Moreover, the present construction enables an unskilled operator to readily manipulate the mechanism so as to produce a desired feed of air and maintain the same once the adjustments have been made. Furthermore, the operator can at all times note the rate at which air is being fed and thus easily supervise operations. The construction, especially in the preferred form, is highly efficient in eliminating the refluxing of pulsations or pressure changes in the refrigerating compartment in a manner which will not interfere with the constant and controlled rate of feed of the air. The constriction in the air feed line affords an especially satisfactory and, at the same time, simple manner of controlling the air feed at the proper rate and uniform pressure. Moreover, there are no moving parts to get out of order, and a single orifice may be employed for different desired rates of flow of gas.

The terms and expressions which have been employed are used as terms of description and not of limitation, and there is no desire, in the use of such terms and expressions, of excluding any equivalents of the features shown and described, or portions thereof, but it is recognized that various modifications are possible within the scope of the invention claimed.

I claim:

1. In continuous apparatus for congealing liquids and simultaneously mixing gas therewith, a cylindrical chamber, a rotatable shaft extending longitudinally thereof, stirring means carried by said shaft, means to continuously admit in constant streams liquid and gas to said chamber at constant rates, the flow of the gas being independent of a rate of flow of the liquid means to continuously withdraw congealed product, and a screw feeding member carried by said shaft adjacent the points of admitting liquid and gas.

2. In continuous apparatus for congealing liquids and simultaneously mixing gas therewith, a cylindrical chamber, a rotatable shaft extending longitudinally thereof, stirring means carried by said shaft, means to continuously admit in constant streams liquid and gas to said chamber at constant rates, means to continuously withdraw congealed product, and a screw feeding member carried by said shaft adjacent the points of admitting liquid and gas, said screw comprising a solid blade constructed and arranged to extend across substantially the full cross-sectional area of said chamber, and said gas admitting means being adapted to feed the gas into the chamber at a point on the opposite side of said blade from said stirring means.

3. An apparatus for continuously mixing a gas with liquids and simultaneously congealing said liquids, a refrigerated chamber, means for feeding liquids to said chamber at a predetermined rate, a supply of gas under super-atmospheric pressure, means for continuously feeding said gas from said supply to said chamber at a constant rate of flow for being mixed into said liquids, said means including a conduit having a constricting member mounted therein and having said member provided with a small unobstructed orifice, and means within said chamber for moving said liquids and the gas occluded therein from one end of said chamber to the other end thereof as the congealing of the body of liquids and gas takes place.

4. In a freezer for making ice cream continuously, a refrigerated chamber, means for feeding an ice cream mix into said chamber, a supply of gas under super-atmospheric pressure, a conduit connecting said gas supply to said chamber, and means mounted in said conduit comprising a constricting member provided with a small unobstructed orifice which allows the gas under pressure to pass to said chamber continuously and at a substantially constant volumetric rate of flow, and a moving dasher mounted within said chamber and adapted to cooperate with said chamber for whipping the ice cream mix and for translating the same through said chamber as the mix is being congealed.

5. In a freezer for making ice cream continuously, a refrigerated chamber, means for feeding an ice cream mix into said chamber, a supply of gas under super-atmospheric pressure, a conduit connecting said gas supply to said chamber, and means mounted in said conduit comprising a constricting member provided with a small unobstructed orifice which allows the gas under pressure to pass to said chamber continuously and at a substantially constant volumetric rate of flow, said constricting member acting to keep the pressure of the gas on the up-stream side of said member above the critical pressure for said orifice, and a dasher mounted within said chamber and adapted to cooperate with said chamber for whipping the ice cream and for translating the same through said chamber as the mix is being congealed.

6. An apparatus of the character described for congealing liquids and mixing gas therewith, a gas-feeding device comprising a container for the gas under super-atmospheric pressure, a mixing chamber for said liquids and said gas, a conduit leading from said container to said chamber, and means comprising a constricting member provided with a small unobstructed orifice, said member being interposed in said conduit and constructed and arranged to control the mass of delivered gas and maintain a continuous substantial volumetric rate of flow through said orifice to said chamber under set operating conditions.

7. In an apparatus of the character described for congealing liquids and mixing gas therewith, a mixing chamber, a gas-feeding device comprising a container for gas under super-atmospheric pressure, a conduit leading from said container to said mixing chamber, and means comprising a constricting member provided with a small unobstructed orifice, said member being interposed in said conduit at a substantial distance from said mixing chamber and constructed to control the mass of delivered gas and maintain a continuously substantial volumetric rate of flow of gas to said mixing chamber.

8. In apparatus of the character described, in combination, a gas feeding device comprising a source of gas under constant super-atmospheric pressure, a conduit, means comprising a constricting member provided with a small unobstructed orifice interposed in said conduit and constructed and arranged to maintain a substantially constant flow of gas therethrough, a manually adjustable pressure regulating valve interposed in the conduit between said device and said source, and a pressure gauge attached to said conduit between said valve and device.

9. Apparatus as claimed in claim 6 wherein said constricting member and orifice are constructed and arranged to produce a pressure on the discharge side of the orifice under normal operating conditions of less than about .53 times the pressure on the feed side.

10. Apparatus as claimed in claim 6, wherein a visible flow meter is interposed in said line.

11. Apparatus for congealing liquids, comprising in combination, a mixing and congealing chamber, means in said chamber causing back-pressure pulsations, a fluid feed line to said chamber, means for supplying fluid at constant pressure to said feed line, and a constricting member in said feed line provided with a very small opening therein through which said fluid must pass at a velocity equal to the maximum or critical velocity for said fluid through said orifice and sufficient to prevent normal pressure pulsations in said feed line on the discharge side of said restricting member from affecting the fluid pressure in said feed line on the fluid supply side of said opening, thereby preventing substantial variations in the continuous rate of flow of said fluid through said opening while the fluid pressure is maintained.

12. An apparatus of the character described for congealing liquids and mixing gas therewith in combination, a gas-feeding device comprising a source of gas under superatmospheric pressure, a mixing chamber to which the liquids and the gas are conducted, a conduit leading from the gas-feeding device to said chamber, means comprising a constricting member provided with a small unobstructed orifice, said member being interposed in said conduit, said member being constructed to maintain a continuously substantial volumetric flow of gas to said mixing chamber, and a manually adjustable pressure-reducing valve interposed in said conduit between the source of said gas and said constricting member for maintaining a constant pressure in said conduit adjacent the up-stream side of said constricting member.

13. In the apparatus for continuously congealing liquids while at the same time incorporating a gas therein, a chamber, means to feed to said chamber at a substantially constant rate the liquid to be congealed, a supply of gas to be added to the liquid, means for introducing said gas to said chamber continuously and at a substantially constant volumetric rate of flow and independent of the rate of flow of the liquid.

14. In an apparatus for continuously producing ice cream, the combination of a chamber, a refrigerant for cooling said chamber, a supply of ice cream mix, means for feeding said mix to said chamber at a substantially constant rate of flow, a supply of air to be added to the mix at a pressure greater than atmospheric pressure, and means for governing the rate of flow of said air to said chamber so as to supply the air continuously and at a substantially constant volumetric rate to thereby maintain the volume of said air to the volume of said mix at a substantially constant ratio and thereby obtaining a desired amount of air volume in the final product.

15. In an apparatus for continuously producing ice cream, the combination of a chamber, a refrigerant passage around said chamber, a supply of ice cream mix, means for feeding said mix to said chamber at a substantially constant rate of flow, a supply of air to be added to the mix at a pressure greater than atmospheric pressure, means for governing the rate of flow of said air to said chamber so as to supply the air continuously and at a substantially constant volumetric rate to thereby maintain the volume of said air to the volume of said mix at a substantially constant ratio and thereby obtaining a desired amount of air volume in the final product, and means for agitating the mix as it passes through said chamber and as it absorbs the air and becomes congealed.

16. In the process of making ice cream continuously, the steps of flowing an ice cream mix into a refrigerated chamber at a continuous rate, flowing air at a pressure greater than atmospheric pressure into the same chamber continuously and at a substantially constant rate of flow, mixing the air into the ice cream mix as the mix is being congealed, and withdrawing the ice cream from said chamber.

17. In the process of making ice cream continuously, the steps of feeding an ice cream mix continuously and at a substantially constant rate into a chamber, feeding air at a pressure greater than atmospheric pressure continuously into said chamber and at a substantially constant volumetric rate of flow, cooling said chamber, beating the air into the ice cream mix to give a substantially uniform distribution of the air therethrough while congealing the mixture, and allowing the ice cream to issue from said chamber.

18. In the process of occluding a gas in a liquid, the steps of supplying a liquid continuously at a substantially constant rate to a mixing chamber, producing a substantially constant volumetric rate of flow of the gas independent of the rate of flow of the liquid and feeding the same continuously to said mixing chamber, agitating said liquid and said gas to distribute said gas substantially uniformly throughout said liquid during the moving of said liquid with the gas through said mixing chamber, and allowing said mixture with the occluded gas therein to issue from said chamber substantially continuous.

19. In a gas flow system in an apparatus of the character described and being capable of being operated at various predetermined pressures, the combination of a conduit for conducting the gas, means for supplying the gas under a predetermined constant super-atmospheric pressure to said conduit, a mixing chamber, means in said mixing chamber causing pulsations in said conduit adjacent said mixing chamber, a constricting member mounted in said conduit away from said mixing chamber and being provided with a relatively small opening therein through which said gas must pass at a velocity equal to the maximum or critical velocity for said gas through said orifice and sufficient to prevent normal pressure pulsations in the part of said conduit between said mixing chamber and said constricting member from affecting the said gas pressure in said conduit on the gas supply side of said constricting member, thereby preventing substantial variations in the continuous rate of flow of said gas through said orifice while the gas supply pressure is maintained.

20. In apparatus of the character described, in combination, a conduit for conducting gas, means to supply gas under constant super-atmospheric pressure to said conduit, means to reduce said pressure to any one of a number of substantially constant pressures in said conduit, a mixing chamber, means in said mixing chamber causing pulsations in said conduit adjacent to said mixing chamber, a constricting member mounted in said conduit between said reducing means and said mixing chamber, said constricting member being provided with a small opening adapted to maintain a constant velocity of the gas under the selected pressure, said orifice being constructed and said pressure being adjusted to prevent normal pressure pulsations in said conduit near said mixing chamber from affecting the pressure between said constricting member and said reducing means whereby a substantially constant flow of the gas is maintained.

21. A combination as claimed in claim 19 wherein said constricting member is formed as a flat plate mounted across said conduit and said opening is of less than about one twenty-fifth of the cross sectional area of the conduit.

EMERY THOMPSON.